(12) United States Patent
Hecht

(10) Patent No.: US 10,646,927 B2
(45) Date of Patent: May 12, 2020

(54) ROUND DOUBLE-SIDED CUTTING INSERT HAVING A PERIPHERAL SURFACE PROVIDED WITH PROTRUDING INDEXING LATCHES, INSERT HOLDER THEREFOR AND CUTTING TOOL

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 15/898,956

(22) Filed: Feb. 19, 2018

(65) Prior Publication Data
US 2019/0255622 A1 Aug. 22, 2019

(51) Int. Cl.
*B23B 27/16* (2006.01)
*B23C 5/22* (2006.01)
(Continued)

(52) U.S. Cl.
CPC ...... *B23B 27/1685* (2013.01); *B23B 27/1618* (2013.01); *B23B 27/1622* (2013.01);
(Continued)

(58) Field of Classification Search
CPC .......... B23C 2200/045; B23C 2200/12; B23C 2200/128; B23C 2200/16; B23C 2200/168; B23C 2200/363; B23C 2210/16; B23C 2200/121; B23C 2200/203; B23C 2210/163; B23C 2210/168; B23C 5/06; B23C 5/2217; B23B 27/1618; B23B 27/1622; B23B 29/12
See application file for complete search history.

(56) References Cited

U.S. PATENT DOCUMENTS 4,378,184 A * 3/1983 Briese .................. B23B 27/145
407/103
4,606,678 A 8/1986 Zweekly
(Continued)

FOREIGN PATENT DOCUMENTS

KR 10-1556737 B1 10/2015

OTHER PUBLICATIONS

International Search Report dated May 23, 2019, issued in PCT counterpart application (No. PCT/IL2019/050087).
(Continued)

*Primary Examiner* — Sara Addisu
(74) *Attorney, Agent, or Firm* — Womble Bond Dickinson (US) LLP

(57) ABSTRACT

A round double-sided cutting insert includes an insert peripheral surface that includes a plurality of angularly spaced apart indexing latches protruding therefrom and a plurality of cylindrical insert side abutment surfaces that circumferentially alternate with the plurality of indexing latches. An insert holder has a pocket peripheral surface which includes at least one indexing gap and a plurality of pocket side abutment surfaces that circumferentially alternate with the at least one indexing gap. When the cutting insert is releasably attached to the insert holder, to constitute a fastened position of a cutting tool, each of the plurality of pocket side abutment surfaces abuts a respective insert side abutment surface and each indexing gap has a respective indexing latch located therein.

38 Claims, 5 Drawing Sheets

(51) Int. Cl.
  *B23B 29/04* (2006.01)
  *B23B 29/12* (2006.01)
  *B23C 5/06* (2006.01)

(52) U.S. Cl.
  CPC ............ *B23B 29/043* (2013.01); *B23B 29/12* (2013.01); *B23C 5/06* (2013.01); *B23C 5/2217* (2013.01); *B23C 5/2221* (2013.01); *B23C 2200/045* (2013.01); *B23C 2200/121* (2013.01); *B23C 2200/203* (2013.01); *B23C 2210/163* (2013.01); *B23C 2210/168* (2013.01)

(56) References Cited

U.S. PATENT DOCUMENTS

| | | | |
|---|---|---|---|
| 5,934,844 A | 8/1999 | Woolley | |
| 6,017,171 A * | 1/2000 | Karlsson | B23C 5/006 407/34 |
| 6,050,751 A * | 4/2000 | Hellstrom | B23B 27/1622 407/103 |
| 6,053,671 A * | 4/2000 | Stedt | B23C 5/2221 407/35 |
| 6,079,912 A | 6/2000 | Rothballer | |
| 6,126,366 A * | 10/2000 | Lundblad | B23B 27/1622 407/102 |
| 6,152,658 A * | 11/2000 | Satran | B23B 27/00 407/103 |
| 6,164,878 A * | 12/2000 | Satran | B23C 5/2221 407/113 |
| 7,255,518 B2 * | 8/2007 | Wallstrom | B23B 27/1662 407/103 |
| 7,264,425 B1 | 9/2007 | Viol | |
| 7,381,015 B2 | 6/2008 | Jonsson | |
| 7,390,149 B2 * | 6/2008 | Wihlborg | B23C 5/06 407/102 |
| 7,677,145 B2 | 3/2010 | Grund et al. | |
| 8,206,066 B2 * | 6/2012 | Men | B23C 5/202 407/113 |
| 8,371,774 B2 | 2/2013 | Zastrozynski | |
| 8,613,576 B2 | 12/2013 | Ebert et al. | |
| 8,657,539 B2 | 2/2014 | Morrison et al. | |
| 8,845,243 B2 * | 9/2014 | Hansson | B23B 27/1622 408/188 |
| 8,858,130 B2 * | 10/2014 | Morrison | B23C 5/06 407/113 |
| 9,011,049 B2 | 4/2015 | Fang et al. | |
| 9,289,834 B2 * | 3/2016 | Park | B23C 5/06 |
| 9,656,334 B2 * | 5/2017 | Saji | B23C 5/06 |
| 10,112,241 B2 * | 10/2018 | Lee | B23C 5/207 |
| 10,183,333 B2 * | 1/2019 | Hecht | B23B 27/1622 |
| 10,350,689 B2 * | 7/2019 | Takahashi | B23C 5/2221 |
| 10,434,583 B2 * | 10/2019 | Kister | B23C 5/2213 |
| 2002/0168235 A1 * | 11/2002 | Johnson | B23C 5/006 407/35 |
| 2003/0059262 A1 * | 3/2003 | Men | B23C 5/2221 407/35 |
| 2006/0269374 A1 * | 11/2006 | Dufour | B23C 5/06 409/132 |
| 2007/0183857 A1 * | 8/2007 | Wihlborg | B23C 5/06 407/67 |
| 2010/0054873 A1 * | 3/2010 | Men | B23C 5/202 407/42 |
| 2011/0103905 A1 | 5/2011 | Morrison et al. | |
| 2012/0076596 A1 | 3/2012 | Kim | |
| 2013/0195567 A1 * | 8/2013 | Sunnvius | B23C 5/06 407/40 |
| 2013/0330135 A1 * | 12/2013 | Burtscher | B23C 5/207 407/42 |
| 2017/0259356 A1 * | 9/2017 | Lee | B23C 5/2247 |
| 2017/0291233 A1 * | 10/2017 | Marie | B23C 5/2221 |
| 2018/0147642 A1 * | 5/2018 | Takahashi | B23C 5/06 |

OTHER PUBLICATIONS

Written Opinion dated May 23, 2019, issued in PCT counterpart application (No. PCT/IL2019/050087).

* cited by examiner

ROUND DOUBLE-SIDED CUTTING INSERT HAVING A PERIPHERAL SURFACE PROVIDED WITH PROTRUDING INDEXING LATCHES, INSERT HOLDER THEREFOR AND CUTTING TOOL

FIELD OF THE INVENTION

The subject matter of the present application relates to cutting tools of the type in which a cutting insert, and more particularly a cutting insert having a round basic shape, and yet further in particular, a cutting insert that is double-sided, is indexably positionable in a pocket of an insert holder.

BACKGROUND OF THE INVENTION

It can be problematic to indexably position round cutting inserts in a pocket of an insert holder since it is difficult to distinguish the cutting edges. Cutting tools can thus be provided with an indexing mechanism for indexably positioning the cutting insert in the pocket.

In some such indexing mechanisms, one of the cutting insert and the pocket can include at least one indexing gap (also referred to as a "recess") and the other one of the cutting insert and the pocket can include at least one indexing latch (also referred to as a "protrusion"). Correct indexable positioning of the cutting insert relative to the pocket is discernable when the at least one indexing latch is located in the at least one indexing gap.

In some such indexing mechanisms, one of the at least one indexing latches and at least one indexing gaps can be located on the bottom of the cutting insert, while the other one of the at least one indexing latches and at least one indexing gaps can be located at a base surface of the pocket. Examples of such cutting inserts are disclosed in, for example, U.S. Pat. Nos. 8,858,130 and 9,011,049.

In other such indexing mechanisms, one of the at least one indexing latches and at least one indexing gaps can be located on the periphery of the cutting insert, while the other one of the at least one indexing latches and at least one indexing gaps can be located at a peripheral surface of the pocket. Examples of such cutting inserts are disclosed in, for example, US 2013/330135 and U.S. Pat. No. 9,289,834.

SUMMARY OF THE INVENTION

In accordance with a first aspect of the subject matter of the present application there is provided a round indexable cutting insert, having insert central axis, the cutting insert comprising:
opposing insert upper and lower surfaces and an insert peripheral surface extending therebetween, the insert peripheral surface extending about the insert central axis; and
upper and lower cutting edges formed at the intersection of the insert peripheral surface and the insert upper and lower surfaces, respectively, wherein:
the insert peripheral surface comprises a plurality of angularly spaced apart indexing latches protruding therefrom and a plurality of insert side abutment surfaces that circumferentially alternate with the plurality of indexing latches; and
the plurality of insert side abutment surfaces lie on an external cylindrical surface of an imaginary insert cylinder that is co-axial with the cutting insert.

In accordance with a second aspect of the subject matter of the present application there is provided an insert holder comprising:
a holder main surface that intersects a holder end surface, and
a holder pocket recessed in the holder main surface and opening out to the holder end surface at a pocket opening, the holder pocket having a pocket major axis and comprising:
a pocket base surface, and a pocket peripheral surface oriented substantially perpendicularly thereto and forming a partial boundary thereof, the pocket base surface being unbounded by the pocket peripheral surface at the pocket opening and comprising a pocket support surface; wherein:
the pocket peripheral surface comprises:
an axially extending internal cylindrical pocket lateral surface divided into a plurality of angularly spaced apart cylindrical pocket side abutment surfaces by at least one non-lateral indexing gap recessed therein, each non-lateral indexing gap located between a pair of adjacent cylindrical pocket side abutment surfaces.

In accordance with a third aspect of the subject matter of the present application there is provided a cutting tool comprising:
a cutting insert of the type described above; and
an insert holder of the type described above; wherein:
the cutting tool is adjustable between a released and fastened position; and
in the fastened position of the cutting tool:
the cutting insert is releasably retained in the holder pocket;
each of the plurality of cylindrical pocket side abutment surfaces abuts a respective insert side abutment surface;
a pocket support surface located on the pocket base surface abuts an insert lower bearing surface located on the insert lower surface; and
each non-lateral indexing gap is occupied by a respective indexing latch.

It is understood that the above-said is a summary, and that features described hereinafter may be applicable in any combination to the subject matter of the present application, for example, any of the following features may be applicable to the cutting insert, insert holder or cutting tool:

The plurality of indexing latches can extend beyond the upper and lower cutting edge in the radially outward direction.

Each of the plurality of angularly spaced apart indexing latches can be convexly shaped in the axial direction.

The insert peripheral surface can lie on the external cylindrical surface.

The plurality of indexing latches can be spaced apart from the insert upper and lower surfaces by an indexing latch distance.

The indexing latch distance can be greater or equal to 0.3 mm and less than or equal to 0.5 mm.

The plurality of indexing latches can protrude from the insert peripheral surface in the radially outward direction by a latch protruding distance. The latch protruding distance can be greater or equal to 0.2 mm and less than or equal to 0.4 mm.

Each of the plurality of indexing latches can have an angular dimension about the insert central axis defined by a latch angle. The latch angle can be greater or equal to 11° and less than or equal to 25°.

The plurality of indexing latches can be angularly spaced apart from one another about the insert central axis by a latch spacing angle. The latch spacing angle can be greater or equal to 35° and less than or equal to 49°.

Each of the plurality of indexing latches can have an angular dimension about the insert central axis defined by a latch angle. The plurality of indexing latches can be angularly spaced apart from one another about the insert central axis by a latch spacing angle. The latch angle can be less than the latch spacing angle.

The latch angle can be less than half the latch spacing angle.

Each indexing latch can comprise axially opposite latch upper and lower central surfaces, the latch upper central surface being closer to the insert upper surface than the latch lower central surface and vice versa. Each of the latch upper and lower central surfaces can slope radially inwardly in a direction towards its adjacent one of the insert upper and lower surfaces.

The latch upper central surfaces can all lie on an imaginary latch upper cone that is co-axial with the cutting insert. The latch lower central surfaces can all lie on an imaginary latch lower cone that is co-axial with the cutting insert.

The plurality of indexing latches can protrude from the insert peripheral surface in the radially outward direction by a latch protruding distance. The latch protruding distance can be greater or equal to 0.2 mm and less than or equal to 0.4 mm.

The latch upper cone can have a latch upper cone aperture. The latch lower cone can have a latch lower cone aperture. The latch upper cone aperture and the latch lower cone aperture can each be greater or equal to 5° and less than or equal to 20°.

The cutting insert can be mirror symmetrical about an insert median plane that is oriented perpendicular to the insert central axis and passes midway between the insert upper and lower surfaces.

The cutting insert can be rotationally symmetrical about the insert central axis.

The plurality of indexing latches can be identical.

The cutting insert can comprise an insert through bore extending between, and opening out to, the insert upper and lower end surfaces along the insert central axis.

The pocket lateral surface can be located on a partially annular pocket raised part extending circumferentially along, and projecting from, the pocket peripheral surface.

Each non-lateral indexing gap can have an angular dimension about the pocket major axis defined by a gap angle. The gap angle can be greater or equal to 12° and less than or equal to 26°.

Each of the plurality of cylindrical pocket side abutment surfaces can have an angular dimension about the pocket major axis defined by a pocket side abutment surface angle. The pocket side abutment surface angle can be greater or equal to 34° and less than or equal to 48°.

Each non-lateral indexing gap can have an angular dimension about the pocket major axis defined by a gap angle. Each of the plurality of cylindrical pocket side abutment surfaces can have an angular dimension about the pocket major axis defined by a pocket side abutment surface angle. The gap angle can be less than the pocket side abutment surface angle.

The gap angle can be less than half the pocket side abutment surface angle.

The axially extending internal cylindrical pocket lateral surface can be divided by exactly one non-lateral indexing gap into exactly two cylindrical pocket side abutment surfaces.

The pocket support surface can be planar and perpendicular to the pocket major axis.

The holder pocket can comprise a pocket threaded bore recessed in and opening out to the pocket base surface along a threaded bore axis.

The pocket peripheral surface can further comprise one or two lateral indexing gaps, the one or two lateral indexing gaps being formed at the intersection of the pocket lateral surface with the holder main surface and/or at the intersection of the pocket lateral surface with the holder end surface.

The insert holder can comprise exactly two lateral indexing gaps, one on either side of the at least one non-lateral indexing gap.

The at least one non-lateral indexing gap can extend the entire height of the pocket lateral surface.

In the fastened position of the cutting tool, each non-lateral indexing gap may not angularly or axially clamp the respective indexing latch.

In the fastened position of the cutting tool, the cutting insert can be releasably retained to the insert holder by a retaining screw located in the insert through bore and threadingly received in the pocket threaded bore.

The cutting tool can be adjustable between a first fastened position and a second fastened position, via a first intermediate position and a second intermediate position. In the first intermediate position of the cutting tool, the retaining screw can be located in the insert through bore and partially threadingly received in the pocket threaded bore. The cutting insert can be disposed away from the plurality of cylindrical pocket side abutment surfaces. Each non-lateral indexing gap can be unoccupied by a respective indexing latch.

The pocket peripheral surface can further comprise two lateral indexing gaps, one formed at the intersection of the pocket lateral surface with the holder main surface and the other formed at the intersection of the pocket lateral surface with the holder end surface. In the first intermediate position of the cutting tool, at least one of the two lateral indexing gaps can be unoccupied by a respective indexing latch.

In the second intermediate position of the cutting tool, the cutting insert can be rotated about the insert central axis so that each non-lateral indexing gap is angularly aligned with a respective insert side abutment surface and each cylindrical pocket side abutment surface is angularly aligned with a respective indexing latch.

Each of the plurality of indexing latches can have an angular dimension about the insert central axis defined by a latch angle. Each non-lateral indexing gap can have an angular dimension about the pocket major axis defined by a gap angle. The gap angle can be greater than the latch angle by no more than 1°.

BRIEF DESCRIPTION OF THE FIGURES

For a better understanding of the present application and to show how the same may be carried out in practice, reference will now be made to the accompanying drawings, in which.

Figure 1:
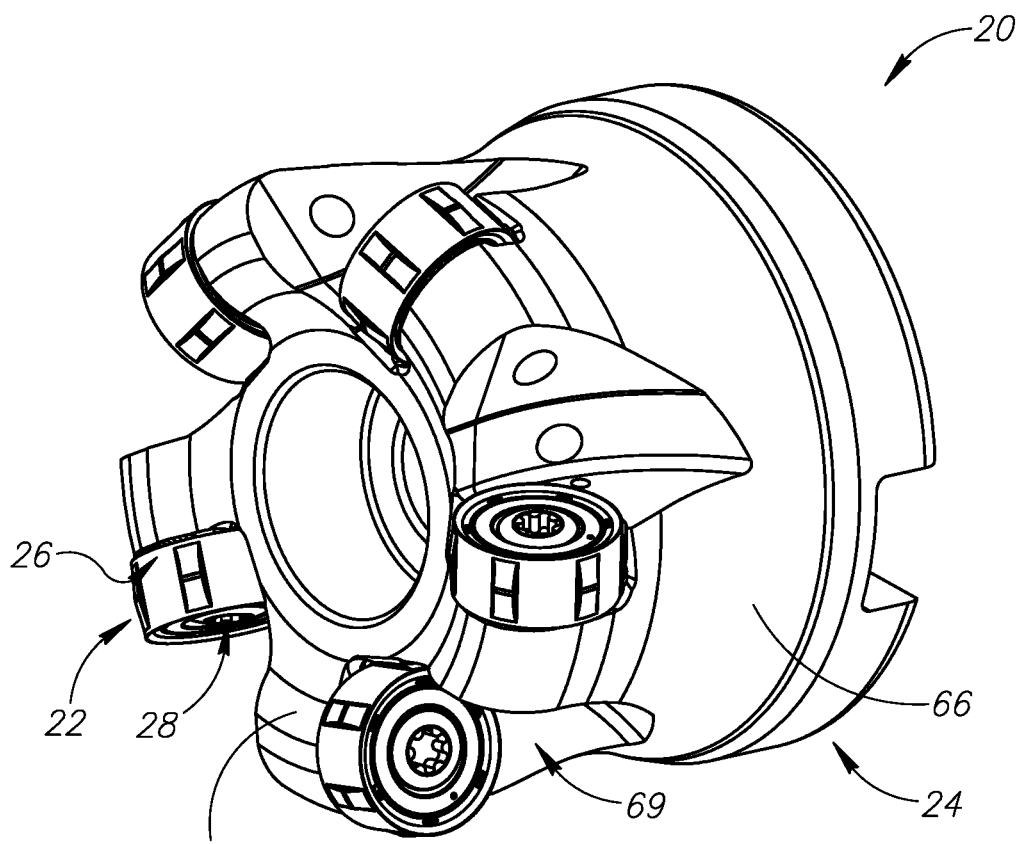
FIG. 1 is a perspective view of a cutting tool.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Attention is first drawn to FIG. 1 showing a cutting tool 20, for chip removal, in accordance with embodiments of the subject matter of the present application. The cutting tool 20 has a cutting insert 22 which can be typically made from cemented carbide. The cutting tool 20 also has an insert holder 24 having a holder pocket 26. The insert holder 24 can be typically made from steel. In this non-limiting example, the cutting tool 20 is a rotary milling tool and the cutting insert 22 is a milling insert. It is noted, however, that the subject matter of the present application also applies to other types of cutting tools and cutting inserts, for example, but not limited to, turning tools and turning inserts. The cutting tool 20 is adjustable between a released and fastened position. In the fastened position of the cutting tool 20, the cutting insert 22 is releasably attached to the insert holder 24, for example, by a retaining screw 28.

Figure 2:
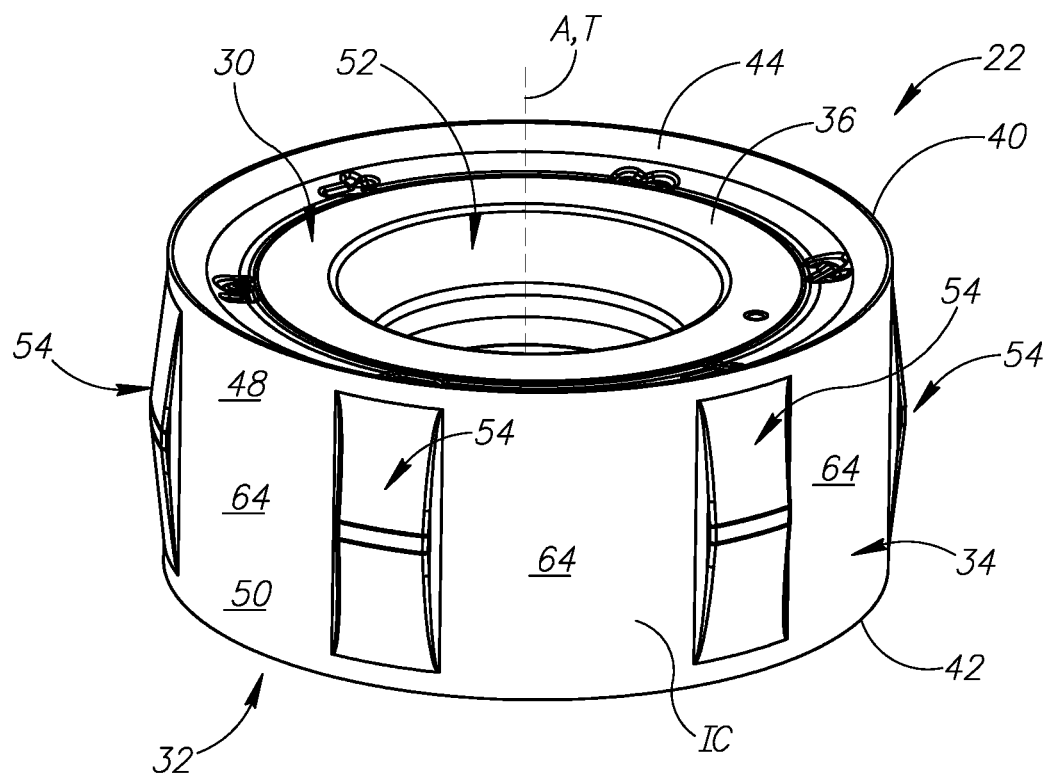
FIG. 2 is a perspective view of a cutting insert in accordance with the present invention.
Figure 3:
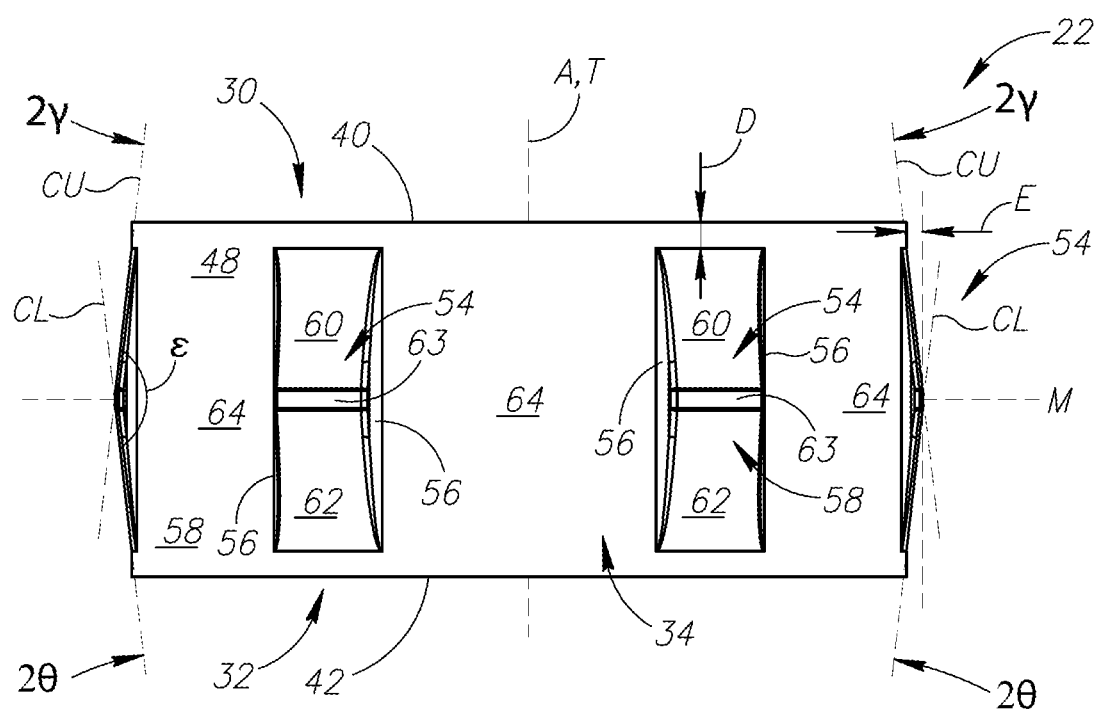
FIG. 3 is a side view of the cutting insert in FIG. 2.
Figure 4:
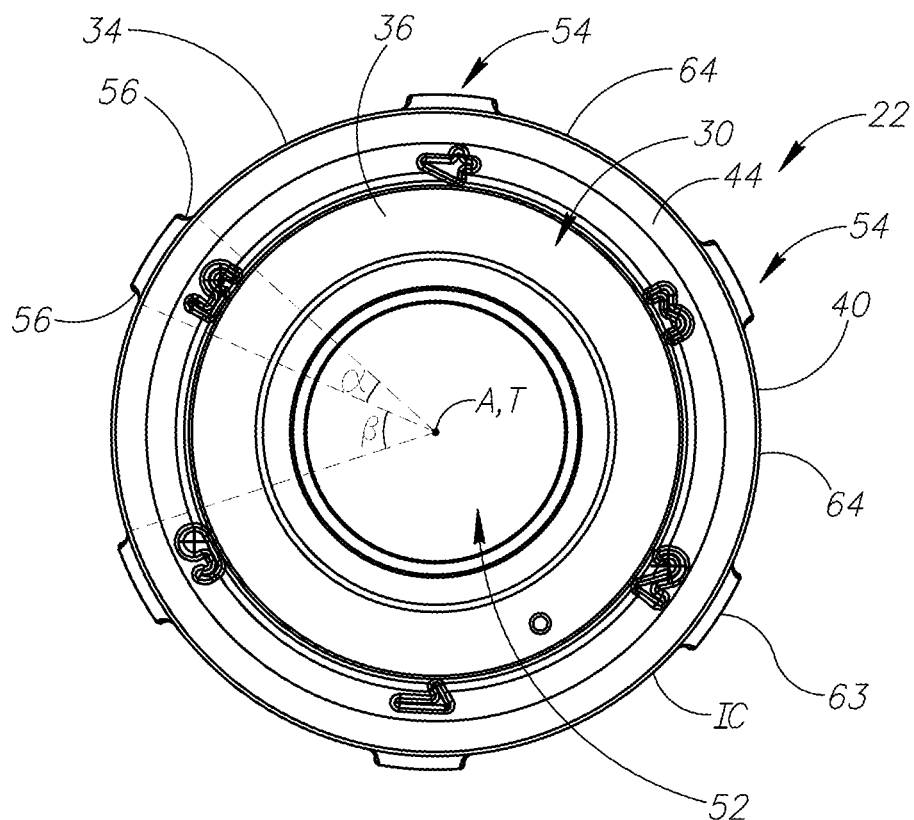
FIG. 4 is a top view of the cutting insert in FIG. 2.

Reference is now made to FIGS. 2 to 4, showing the cutting insert 22, in accordance with the subject matter of the present application, relating to a first aspect of the invention. The cutting insert 22 comprises a unitary integral one-piece construction. The cutting insert 22 has an insert central axis A. The cutting insert 22 includes opposing insert upper and lower surfaces 30, 32. The insert central axis A extends through the insert upper and lower surfaces 30, 32. The cutting insert 22 further includes an insert peripheral surface 34 that extends between the insert upper and lower surfaces 30, 32. The insert peripheral surface 34 extends about the insert central axis A. The cutting insert 22 has an insert median plane M that is oriented perpendicular to the insert central axis A and that passes midway between the insert upper and lower surfaces 30, 32.

In accordance with some embodiments of the subject matter of the present application, the cutting insert 22 can be rotationally symmetrical about the insert central axis A. The cutting insert 22 can be mirror symmetrical about the insert median plane M.

In accordance with some embodiments of the subject matter of the present application, the insert peripheral surface 34 can extend about the insert central axis A at a constant distance therefrom. Stated differently, the insert peripheral surface 34 can lie on an external cylindrical surface IC of an imaginary insert cylinder that has the insert central axis A as its cylinder axis (i.e. the insert cylinder and the cutting insert 22 are co-axial with each other).

The insert upper and lower surfaces 30, 32 have a round basic shape. In other words, the cutting insert 22 is round. The insert upper surface 30 includes an insert upper bearing surface 36. Likewise, the insert lower surface 32 includes an insert lower bearing surface 38. The insert upper and lower bearing surfaces 36, 38 are configured for contacting a corresponding surface in the holder pocket 26 when the cutting insert 22 is seated therein. In accordance with some embodiments of the subject matter of the present application, the insert upper and lower bearing surfaces 36, 38 can be planar and parallel to each other. The insert upper and lower bearing surfaces 36, 38 can be centrally disposed on their respective insert upper and lower surfaces 30, 32.

The cutting insert 22 includes upper and lower cutting edges 40, 42 formed at the intersection of the insert peripheral surface 34 and the insert upper and lower surfaces 30, 32, respectively. Thus, the cutting insert 22 is double-sided, and can be seated in the holder pocket 26 on either of the insert upper and lower bearing surfaces 36, 38. In other words, the cutting insert 22 is "reversible". The upper and lower cutting edges 40, 42 can be circular and lie in two parallel, spaced apart planes that are perpendicular to the insert central axis A.

The insert upper surface 30 includes an upper rake surface 44 that extends along the upper cutting edge 40. In accordance with some embodiments of the subject matter of the present application, the upper rake surface 44 can connect the upper cutting edge 40 to the insert upper bearing surface 36. The portion of the upper rake surface 44 adjoining the upper cutting edge 40 can slope towards the insert median plane M in a radially inward direction. Similarly, the insert lower surface 32 includes a lower rake surface 46 that can be configured and oriented in an identical manner.

The insert peripheral surface 34 includes upper and lower relief surfaces 48, 50 that extend along the upper and lower cutting edges 40, 42, respectively.

In accordance with some embodiments of the subject matter of the present application, the cutting insert 22 can include an insert through bore 52, designed for clamping the cutting insert 22 in the holder pocket 26 with the retaining screw 28. The insert through bore 52 extends between, and opens out to, the insert upper and lower surfaces 30, 32. The insert through bore 52 can extend along the insert central axis A, which therefore may serve as a through bore axis T. The insert through bore 52 is for receiving the retaining screw 28 in order to secure the cutting insert 22 to the insert holder 24.

The insert peripheral surface 34 includes a plurality of angularly ("circumferentially") spaced apart indexing latches 54 that protrude in a radially outward direction therefrom. The plurality of indexing latches 54 serve to give notification that the cutting insert 22 is in a correct indexable position in the holder pocket 26. The number of indexing latches 54 determines the number of indexable positions the cutting insert 22 has for each side thereof, when seated in the holder pocket 26. In this non-limiting example shown in the drawings, the insert peripheral surface 34 includes exactly six indexing latches 54 and is therefore 12-ways indexable (six per side).

In contrast to the gaps ("recesses") and accompanying undercuts formed in the insert peripheral surfaces of the double-sided cutting inserts seen in aforementioned U.S.

Pat. No. 9,289,834 and US 2013/0330135, the present cutting insert has protrusions 54 formed on the insert peripheral surface 34. Thus, during the manufacturing process, the present insert can advantageously be pressed using a single-axis two-part die whose halves meet at what will later become the insert median plane M. Thus, manufacture of the present insert can potentially avoid additional costs associated with either pressing with a multi-axis die or machining gaps/recesses in the insert peripheral surface.

Referring to FIG. 3, in accordance with some embodiments of the subject matter of the present application, the plurality of indexing latches 54 can extend beyond the upper and lower cutting edge 40, 42 in the radially outward direction. The plurality of indexing latches 54 can protrude from the insert peripheral surface 34 in the radially outward direction by a latch protruding distance E. The latch protruding distance E can be in the range, 0.2 mm≤E≤0.4 mm. The plurality of indexing latches 54 can all be identical to one another. The plurality of indexing latches 54 can be evenly spaced apart. The plurality of indexing latches 54 can be spaced apart from the insert upper and lower surfaces 30, 32. By virtue of the plurality of indexing latches 54 being spaced apart from the insert upper and lower surfaces 30, 32 the cutting insert 22 is neutral with 0° clearance. The plurality of indexing latches 54 can be spaced apart from the insert upper and lower surfaces 30, 32 by an indexing latch distance D. The indexing latch distance D can be in the range, 0.3 mm≤D≤0.5 mm.

Referring to FIG. 3, in accordance with some embodiments of the subject matter of the present application, each indexing latch 54 can include two circumferentially opposite latch side surfaces 56 and a latch central surface 58 that extends therebetween. The two latch side surfaces 56 extend generally in the radially outward direction from the insert peripheral surface 34. Preferably, in a top view of the cutting insert 22 (i.e. FIG. 4), for any given indexing latch 54, the latch side surfaces 56 can converge towards each other in the radially outwards direction. Thus, in the top view of the cutting insert 22, each indexing latch 54 is widest at its base (closest to the insert peripheral surface 34) and is narrowest at a radially outermost portion of the latch central surface 58.

Referring again to FIG. 4, opposing extremities, in the circumferential direction, of each of the plurality of indexing latches 54 (e.g. the two latch side surfaces 56) subtend a latch angle α at the insert central axis A. That is to say, each of the plurality of indexing latches 54 has an angular dimension about the insert central axis A defined by the latch angle α. In accordance with some embodiments of the subject matter of the present application, the latch angle α can be in the range, 11°≤α≤25°.

Referring to FIG. 3, in accordance with some embodiments of the subject matter of the present application, the plurality of indexing latches 54 are angularly spaced apart from one another about the insert central axis A by a latch spacing angle β. The latch spacing angle β can be in the range, 35°≤β≤49°. The latch angle α can be less than the latch spacing angle β. Preferably, the latch angle α can be less than half the latch spacing angle β. In the case of an insert having equally angularly spaced apart indexing latches having equal-sized latch angles, 360°=(α+β)×(Number of indexing positions).

In accordance with some embodiments of the subject matter of the present application, each of the plurality of angularly spaced apart indexing latches 54 can be convexly shaped in the axial direction (i.e. in a side view of the cutting insert 22—see FIG. 3). The latch central surface 58 can include axially opposite latch upper and lower central surfaces 60, 62. The latch upper and lower central surfaces 60, 62 can be spaced apart from each other by a latch intermediate surface 63. The latch intermediate surface 63 can lie on a cylinder that is co-axial with the insert peripheral surface 34 and form a radially outermost portion of the latch central surface 58. The latch upper central surface 60 is closer to the insert upper surface 30 than the latch lower central surface 62 and vice versa, i.e. the latch lower central surface 62 is closer to the insert lower surface 32 than the latch upper central surface 60. The latch upper central surface 60 can slope radially inwardly in a direction towards the insert upper surface 30 and the latch lower central surface 62 can slope radially inwardly in a direction towards the insert lower surface 32. Stated differently, each of the latch upper and lower central surfaces 60, 62 can slope radially inwardly in a direction towards its adjacent one of the insert upper and lower surfaces 30, 32. Thus, in a side view of the cutting insert 22 (i.e. FIG. 3), for any given indexing latch 54, the latch upper and lower central surfaces 60, 62 can converge towards each other in the radially outward direction at a latch convergence angle ε. Preferably, the latch convergence angle ε can be in the range 70°≤ε≤84°. It is noted that such a configuration when combined with the aforementioned range of the latch protruding distance E ensure that the indexing latches 54 adjacent the active cutting edge don't interfere with the work piece when performing a metal cutting operation.

Referring to FIG. 3, in accordance with some embodiments of the subject matter of the present application, the latch upper and lower central surfaces 60, 62 can be disposed on opposite sides of the insert median plane M. The latch upper central surfaces 60 can all lie on an imaginary latch upper cone CU that is co-axial with the cutting insert 22. The latch upper cone CU has a latch upper cone aperture 2γ. The latch upper cone aperture 2γ can be in the range, 5°≤2γ≤20°. The latch lower central surfaces 62 can all lie on an imaginary latch lower cone CL that is co-axial with the cutting insert 22. The latch lower cone CL has a latch lower cone aperture 2θ. The latch lower cone aperture 2θ can be in the range, 5°≤2θ≤20°. The latch upper cone aperture 2γ and latch lower cone aperture 2θ can be equal. The latch upper and lower cones CU, CL point away from each other.

The insert peripheral surface 34 includes a plurality of insert side abutment surfaces 64. The plurality of insert side abutment surfaces 64 circumferentially alternate with the plurality of indexing latches 54. Each insert side abutment surface 64 is located between a pair of adjacent indexing latches 54. Each insert side abutment surface 64 may not necessarily extend to the pair of adjacent indexing latches 54 (i.e. the plurality of insert side abutment surfaces 64 can be spaced apart from the plurality of indexing latches 54). The plurality of insert side abutment surfaces 64 lie on the external cylindrical surface IC. The plurality of insert side abutment surfaces 64 are configured for contacting a corresponding surface in the holder pocket 26 when the cutting insert 22 is seated therein.

A second aspect of the subject matter of the present application relates to the insert holder 24. Attention is drawn to FIGS. 5 and 6. The insert holder 24 includes a holder main surface 66 that intersects a holder end surface 68. The insert holder 24 includes a holder pocket 26 for releasably attaching the cutting insert 22 therein. In this non-limiting example shown in the drawings, the holder pocket 26 is located at the end of a holder flute 69 that is recessed on the holder pocket 26 and opens out to the holder end surface 68.

The holder pocket 26 has a pocket major axis B. The holder pocket 26 has a unitary integral one-piece construction. The holder pocket 26 is recessed in the holder main surface 66. The holder pocket 26 opens out to the holder end surface 68 at a pocket opening 70. The holder pocket 26 includes a pocket base surface 72 and a pocket peripheral surface 74. The pocket peripheral surface 74 extends from the holder main surface 66 to the holder end surface 68. The pocket peripheral surface 74 is oriented substantially perpendicularly to the pocket base surface 72 and forms a partial boundary of the pocket base surface 72. The pocket base surface 72 is unbounded by the pocket peripheral surface 74 at the pocket opening 70. The pocket base surface 72 is intersected by the pocket major axis B.

Figure 5:
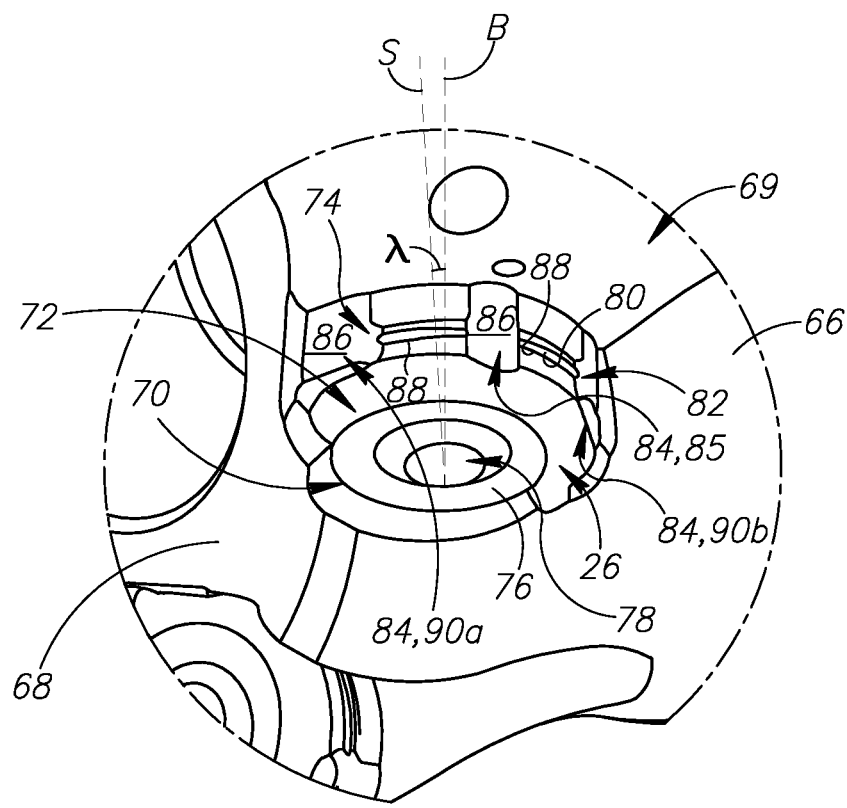
FIG. 5 is a perspective view of a holder pocket of an insert holder in FIG. 1.
Figure 6:
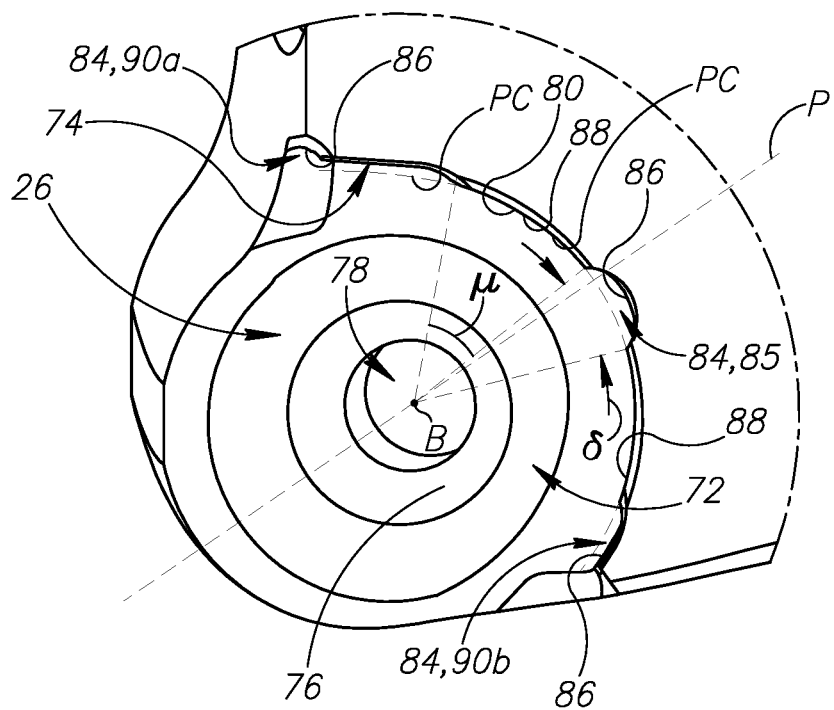
FIG. 6 is a top view of the holder pocket in FIG. 5.

Referring to FIGS. 5 to 6, the pocket base surface 72 includes a pocket support surface 76. The pocket support surface 76 is configured for contacting a corresponding surface in the cutting insert 22 when the cutting insert 22 is seated therein. In accordance with some embodiments of the subject matter of the present application, the pocket support surface 76 can be planar and perpendicular to the pocket major axis B. The pocket support surface 76 can be centrally disposed on the pocket base surface 72.

The pocket peripheral surface 74 includes a pocket lateral surface 80. The pocket lateral surface 80 extends about, and faces towards, the pocket major axis B at a constant distance. Stated differently, the pocket peripheral surface 74 axially extends along the pocket major axis B and lies on an internal cylindrical surface PC of an imaginary pocket cylinder that has the pocket major axis B as its cylinder axis (i.e. the pocket cylinder and the holder pocket 26 are co-axial with each other). In accordance with some embodiments of the subject matter of the present application, the diameter of the pocket cylinder can be equal to the diameter of the insert cylinder. The pocket lateral surface 80 can be located on a partially annular pocket raised part 82 that extends circumferentially along, and projects from, the pocket peripheral surface 74.

The pocket lateral surface 80 is interrupted by at least one indexing gap 84. The at least one indexing gap 84 is designed to receive a respective one of the indexing latches 54. The at least one indexing gap 84 is recessed in the pocket lateral surface 80. The at least one indexing gap 84 is formed by a recessed gap surface 86, at least a portion of which is configured to serve as a rotational stop for an indexing latch 54.

The at least one indexing gap 84 may also include at least one non-lateral indexing gap 85 that is spaced apart from the holder main surface 66 and the holder end surface 68. In accordance with some embodiments of the subject matter of the present application, the at least one indexing gap 84 can include exactly one non-lateral indexing gap 85. In the configuration with more than one non-lateral indexing gap 85, the non-lateral indexing gaps 85 can be identical. Each non-lateral indexing gap 85 has an angular dimension about the pocket major axis B defined by a gap angle $\delta$. The gap angle $\delta$ can be in the range, $12° \leq \delta \leq 26°$. The gap angle $\delta$ can be greater than the latch angle $\alpha$ by no more than 1°. In this non-limiting example shown in the drawings, the gap surface 86 of the at least one non-lateral indexing gap 85 is concavely curved in a view along the pocket major axis B. The at least one non-lateral indexing gap 85 can extend the entire height of the pocket lateral surface 80.

In accordance with some embodiments of the subject matter of the present application, at least one indexing gap 84 can additionally include one or two lateral indexing gaps 90. The one or two lateral indexing gaps 90 are formed at opposite circumferential ends of the pocket lateral surface 80, located at the intersection of the pocket lateral surface 80 with the holder main surface 66 and/or at the intersection of the pocket lateral surface 80 with the holder end surface 68. As seen in the drawings, the lateral indexing gaps 90 are formed as cutouts at the aforementioned intersections and thus differ in shape from the non-lateral indexing gaps 85. In this non-limiting example shown in the drawings, the at least one indexing gap 84 includes exactly two lateral indexing gaps 90, a first lateral indexing gap 90*a* that intersects the holder end surface 68, and a second lateral indexing gap 90*b* that intersects the holder main surface 66. The first and second lateral indexing gaps 90*a*, 90*b* may not be identical. The exactly two lateral indexing gaps 90 are located on either side of the at least one non-lateral indexing gap 85.

The at least one indexing gap 84 defines a plurality of angularly spaced apart pocket side abutment surfaces 88 that circumferentially alternate with the at least one non-lateral indexing gap 85 about the pocket major axis B. More specifically, the axially extending internal cylindrical pocket lateral surface 80 is divided into the plurality of angularly spaced apart cylindrical pocket side abutment surfaces 88 by one or more non-lateral indexing gaps 85. The plurality of pocket side abutment surfaces 88 are located on the pocket lateral surface 80, and are thus cylindrical. Each non-lateral indexing gap 85 is located between a pair of adjacent pocket side abutment surfaces 88. Thus, the non-lateral indexing gaps 85 are spaced apart from the holder main surface 66 and the holder end surface 68. Each pocket side abutment surface 88 can be adjoined on one or both of its sides, in the circumferential direction, by a respective one of the at least one non-lateral indexing gaps 85. In accordance with some embodiments of the subject matter of the present application, the pocket lateral surface 80 can include exactly two pocket side abutment surfaces 88.

In accordance with some embodiments of the subject matter of the present application, each of the plurality of pocket side abutment surfaces 88 can have an angular dimension about the pocket major axis B defined by a pocket side abutment surface angle $\mu$. The pocket side abutment surface angle $\mu$ can be in the range, $34° \leq \mu \leq 48°$. The gap angle $\delta$ can be less than the pocket side abutment surface angle $\mu$. Preferably, the gap angle $\delta$ can be less than half the pocket side abutment surface angle $\mu$.

Figure 8:
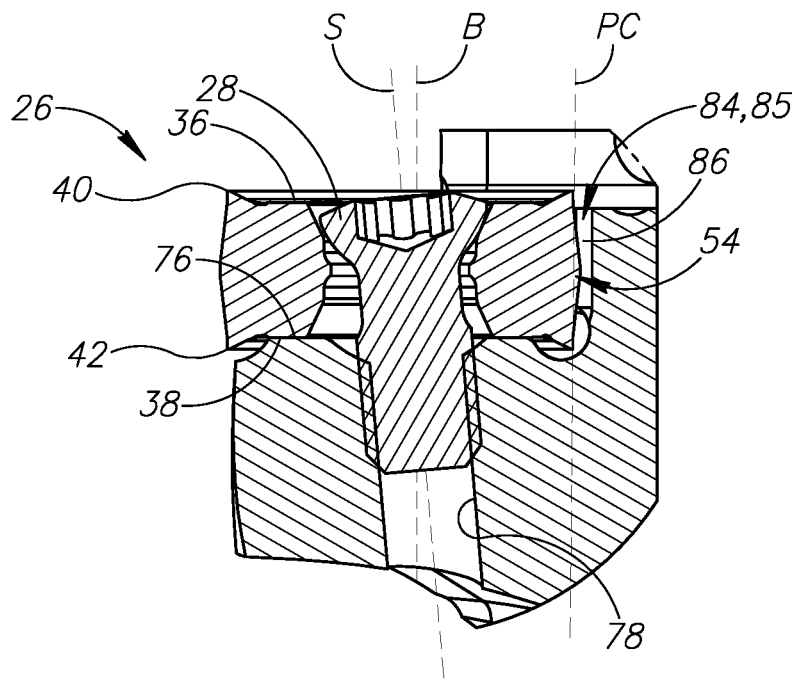
FIG. 8 is a cross section view taken along line XIII-XIII in FIG. 7.

Referring to FIGS. 5, 6 and 8, in accordance with some embodiments of the subject matter of the present application, the holder pocket 26 can include a pocket threaded bore 78 that is designed for threadingly receiving the retaining screw 28 in order to secure the cutting insert 22 to the insert holder 24. The pocket threaded bore 78 can be recessed in, and open out to, the pocket base surface 72, and preferably the pocket support surface 76. The pocket threaded bore 78 extends along a threaded bore axis S. The threaded bore axis S and the pocket major axis B can be non-parallel to each other. The threaded bore axis S and the pocket major axis B can lie in a threaded bore plane P that intersects one of the at least one non-lateral indexing gaps 85. The threaded bore axis S can be slanted with respect to the pocket major axis B. In particular, the threaded bore axis S and the pocket major axis B can define a threaded bore angle $\lambda$ in the threaded bore plane P. The threaded bore angle $\lambda$ can be in the range, $1° \leq \lambda \leq 10°$. Advantageously, the threaded bore angle $\lambda$ ensures a firm seating of the cutting insert 22 in the holder pocket 26 where the clamping force is directed towards the pocket support surface 76 and the plurality of pocket side abutment surfaces 88.

Figure 7:
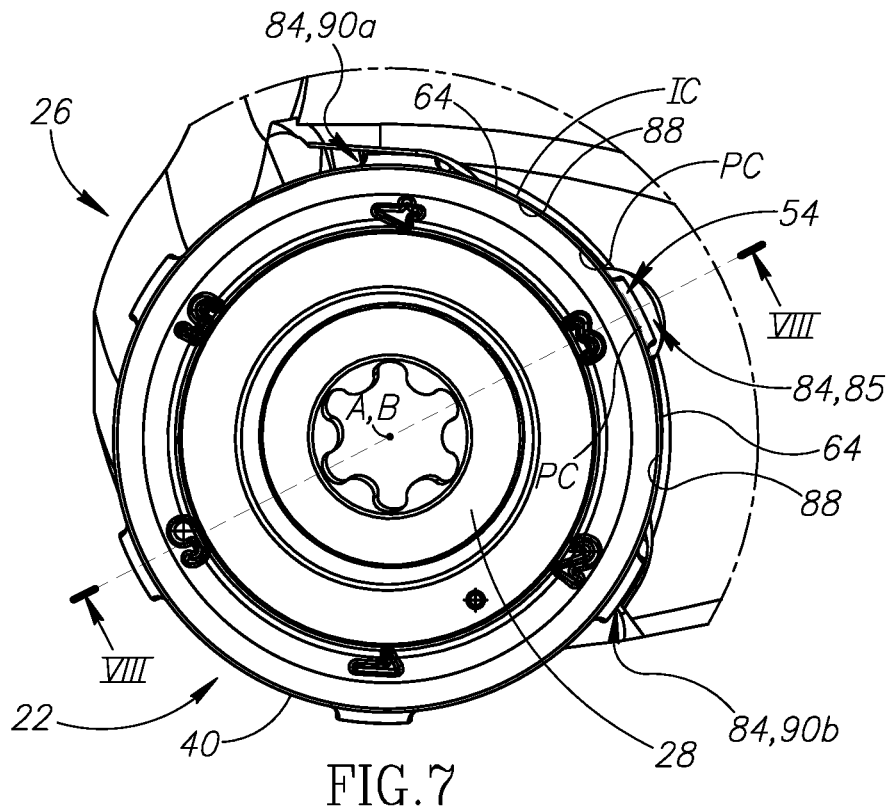
FIG. 7 is a top view of the holder pocket in FIG. 6, when the cutting tool is in a fastened position.

The seating and support of the cutting insert 22 in the holder pocket 26 will be described with reference to FIGS. 1, 7 and 8. In the fastened position of the cutting tool 20, the cutting insert 22 is releasably retained in the holder pocket 26 of the insert holder 24. In this non-limiting example shown in the drawings, the cutting insert 22 is retained in the holder pocket 26 by the retaining screw 28 located in the insert through bore 52 and threadingly received in the pocket threaded bore 78. The insert central axis A and the pocket major axis B can be co-incident.

Referring to FIG. 8, showing a cross-section taking in a plane containing the insert central axis A and the pocket major axis B and passing through one of the non-lateral indexing gaps 85, in the fastened position of the cutting tool 20, the pocket support surface 76 abuts the insert lower bearing surface 38. Each of the plurality of cylindrical pocket side abutment surfaces 88 abuts a respective cylindrical insert side abutment surface 64. Each non-lateral indexing gap 85 has a respective indexing latch 54 located therein. Thus, rotation of the cutting insert 22 about the insert central axis A in both rotational directions is prevented by contact between a respective one of the latch side surfaces 56 and the gap surface 86 of each non-lateral indexing gap 85. In the configuration that includes one or two lateral indexing gaps 90, one or both can have a respective indexing latch 54 located therein. It is noted that the lateral indexing gaps 90 prevent rotation about the insert central axis A in only one rotational direction. Specifically, the first lateral indexing gap 90a prevents rotation of the cutting insert 22 only in a clockwise direction (in a top view of the holder pocket 26), and the second lateral indexing gap 90b prevents rotation of the cutting insert 22 only in a counter-clockwise direction.

It should be appreciated that an indexing gap 84 has a respective indexing latch 54 located therein if, in a top view of the holder pocket 26 (i.e. FIG. 7), the indexing latch 54 extends beyond the internal cylindrical surface PC into the indexing gap 84. In such case, the indexing gap 84 is considered to be occupied by that indexing latch 54. Likewise, an indexing gap 84 is empty of a respective indexing latch 54 if, from the same view, the indexing latch 54 does not extend beyond the internal cylindrical surface PC into the indexing gap 84. In such case, the indexing gap 84 is considered to be unoccupied by an indexing latch 54.

In accordance with some embodiments of the subject matter of the present application, each non-lateral indexing gap 85, and optionally each lateral indexing gap 90 when present, is spaced apart from the respective indexing latch 54. In accordance with some embodiments of the subject matter of the present application, at most one of the two latch side surfaces 56 can abut the gap surface 86. In all configurations, each non-lateral indexing gap 85, and optionally each lateral indexing gap 90 when present, may not angularly or axially clamp the respective indexing latch 54. It is understood here that "abutting" does not necessitate "clamping" and so a first part may abut a second part without clamping that second part.

Figure 9:
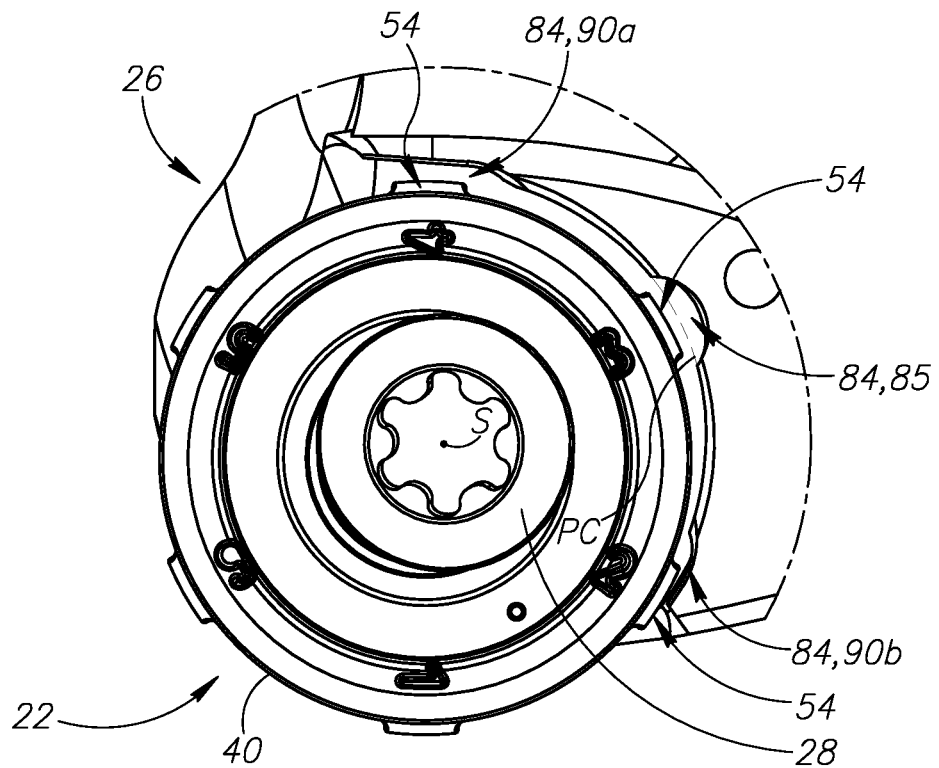
FIG. 9 is a top view of the holder pocket in FIG. 6, when the cutting tool is in a first intermediate position.

When indexing the cutting insert 20, the cutting tool 20 is adjusted between two different fastened positions, a first fastened position and a second fastened position, via a first intermediate position and a second intermediate position. Referring to FIG. 9, from the first fastened position, the retaining screw 28 is partially unthreaded from the pocket threaded bore 78. The radial dimension of the retaining screw 28 is less than that of the insert through bore 52. Thus, the cutting insert 22 can be disposed away from the plurality of pocket side abutment surfaces 88 so that each non-lateral indexing gap 85 is unoccupied by a respective indexing latch 54. In a first optional configuration having two lateral indexing gaps 90, at least one of lateral indexing gaps 90 is unoccupied by a respective indexing latch 54. In a second optional configuration having only one lateral indexing gap 90, the lateral indexing gap 90 may or may not be unoccupied. In such foregoing states, the cutting tool 20 is in the first intermediate position. If there are no lateral indexing gaps 90 occupied by an indexing latch 54, the cutting insert 22 is freely rotatable in both directions about the insert central axis A. Otherwise, the cutting insert 22 is freely rotatable in only one direction about the insert central axis A. In this non-limiting example shown in the drawings, only the first lateral indexing gap 90a is unoccupied by a respective indexing latch 54.

Figure 10:
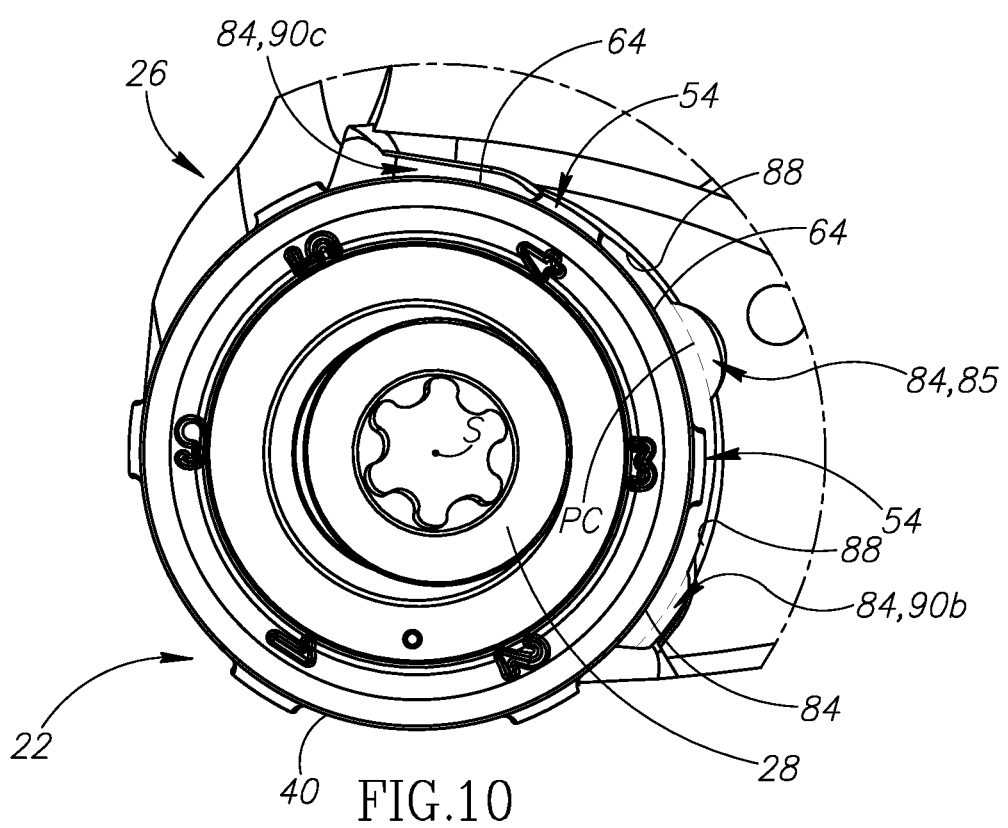
FIG. 10 is a top view of the holder pocket in FIG. 6, when the cutting tool is in a second intermediate position.

Referring to FIG. 10, in the second intermediate position of the cutting tool 20, the cutting insert 22 is rotated about the insert central axis A so that each non-lateral indexing gap 85 is angularly aligned with a respective insert side abutment surface 64 and each pocket side abutment surface 88 is angularly aligned with a respective indexing latch 54. Clearly, none of the indexing gaps 84 have an indexing latch 54 located therein. Further rotation of the cutting insert 22 about the insert central axis A results in each non-lateral indexing gap 85 being aligned with a respective indexing latch 54, at which stage each indexing latch 54 is free to fall into the corresponding non-lateral indexing gap 85. Subsequent tightening of the retaining screw 28 achieves the second fastened position of the cutting tool 20.

Although the subject matter of the present application has been described to a certain degree of particularity, it should be understood that various alterations and modifications could be made without departing from the spirit or scope of the invention as hereinafter claimed.

What is claimed is:

1. A round indexable cutting insert (22), having insert central axis (A), the cutting insert (22) comprising:
   opposing insert upper and lower surfaces (30, 32) and an insert peripheral surface (34) extending therebetween, the insert peripheral surface (34) extending about the insert central axis (A); and
   upper and lower cutting edges (40, 42) formed at the intersection of the insert peripheral surface (34) and the insert upper and lower surfaces (30, 32), respectively, wherein:
   the insert peripheral surface (34) comprises a plurality of angularly spaced apart indexing latches (54) protruding radially outwardly therefrom and a plurality of insert side abutment surfaces (64) that circumferentially alternate with the plurality of indexing latches (54); and
   the plurality of insert side abutment surfaces (64) lie on an external cylindrical surface (IC) of an imaginary insert cylinder that is co-axial with the cutting insert (22).

2. The cutting insert (22), according to claim 1, wherein the plurality of indexing latches (54) extend beyond the upper and lower cutting edge (40, 42) in the radially outward direction.

3. The cutting insert (22), according to claim 1, wherein each of the plurality of angularly spaced apart indexing latches (54) is convexly shaped in the axial direction.

4. The cutting insert (22), according to claim 1, wherein the insert peripheral surface (34) lies on the external cylindrical surface (IC).

5. The cutting insert (22), according to claim 1, wherein the plurality of indexing latches (54) are spaced apart from the insert upper and lower surfaces (30, 32) by an indexing latch distance (D).

6. The cutting insert (22), according to claim 5, wherein the indexing latch distance (D) is in the range, 0.3 mm≤D≤0.5 mm.

7. The cutting insert (22), according to claim 1, wherein:
the plurality of indexing latches (54) protrude from the insert peripheral surface (34) in the radially outward direction by a latch protruding distance (E); and
the latch protruding distance (E) is in the range, 0.2 mm≤D≤0.4 mm.

8. The cutting insert (22), according to claim 1, wherein:
each of the plurality of indexing latches (54) has an angular dimension about the insert central axis (A) defined by a latch angle (a); and
the latch angle (a) is in the range, 11°≤α≤25°.

9. The cutting insert (22), according to claim 1, wherein:
the plurality of indexing latches (54) are angularly spaced apart from one another about the insert central axis (A) by a latch spacing angle (β); and
the latch spacing angle (β) is in the range, 35°≤θ≤49°.

10. The cutting insert (22), according to claim 1, wherein:
each of the plurality of indexing latches (54) has an angular dimension about the insert central axis (A) defined by a latch angle (α);
the plurality of indexing latches (54) are angularly spaced apart from one another about the insert central axis (A) by a latch spacing angle (β); and
the latch angle (α) is less than the latch spacing angle (β).

11. The cutting insert (22), according to claim 10, wherein the latch angle (α) is less than half the latch spacing angle (β).

12. The cutting insert (22), according to claim 1, wherein:
each indexing latch (54) comprises axially opposite latch upper and lower central surfaces (60, 62), the latch upper central surface (60) being closer to the insert upper surface (30) than the latch lower central surface (62) and vice versa; and
each of the latch upper and lower central surfaces (60, 62) slopes radially inwardly in a direction towards its adjacent one of the insert upper and lower surfaces (30, 32).

13. The cutting insert (22), according to claim 12, wherein:
the latch upper central surfaces (60) all lie on an imaginary latch upper cone (CU) that is co-axial with the cutting insert (22); and
the latch lower central surfaces (62) all lie on an imaginary latch lower cone (CL) that is co-axial with the cutting insert (22).

14. The cutting insert (22), according to claim 13, wherein:
the plurality of indexing latches (54) protrude from the insert peripheral surface (34) in the radially outward direction by a latch protruding distance (E); and
the latch protruding distance (E) is in the range, 0.2 mm≤D≤0.4 mm.

15. The cutting insert (22), according to claim 13, wherein:
the latch upper cone (CU) has a latch upper cone aperture (2γ);
the latch lower cone (CL) has a latch lower cone aperture (2θ); and
the latch upper cone aperture (2γ) and the latch lower cone aperture (2θ) are each in the range, 5°≤2γ, 2θ≤20°.

16. The cutting insert (22), according to claim 1, wherein the cutting insert (22) is mirror symmetrical about an insert median plane (M) that is oriented perpendicular to the insert central axis (A) and passes midway between the insert upper and lower surfaces (30, 32).

17. The cutting insert (22), according to claim 1, wherein the cutting insert (22) is rotationally symmetrical about the insert central axis (A).

18. The cutting insert (22), according to claim 1, wherein the plurality of indexing latches (54) are identical.

19. The cutting insert (22), according to claim 1, wherein the cutting insert (22) comprises an insert through bore (52) extending between, and opening out to, the insert upper and lower end surfaces (30, 32) along the insert central axis (A).

20. An insert holder (24) comprising:
a holder main surface (66) that intersects a holder end surface (68), and
a holder pocket (26) recessed in the holder main surface (66) and opening out to the holder end surface (68) at a pocket opening (70), the holder pocket (26) having a pocket major axis (B) and comprising:
a pocket base surface (72), and a pocket peripheral surface (74) oriented substantially perpendicularly thereto and forming a partial boundary thereof, the pocket base surface (72) being unbounded by the pocket peripheral surface (74) at the pocket opening (70) and comprising a pocket support surface (76); wherein:
the pocket peripheral surface (74) comprises:
an axially extending internal cylindrical pocket lateral surface (80) divided into a plurality of angularly spaced apart concave right cylindrical pocket side abutment surfaces (88) by at least one non-lateral indexing gap (85) recessed therein, each non-lateral indexing gap (85) located between a pair of adjacent concave right cylindrical pocket side abutment surfaces (88).

21. The insert holder (24), according to claim 20, wherein the pocket lateral surface (80) is located on a partially annular pocket raised part (82) extending circumferentially along, and projecting from, the pocket peripheral surface (74).

22. The insert holder (24), according to claim 20, wherein:
each of the plurality of right cylindrical pocket side abutment surfaces (88) has an angular dimension about the pocket major axis (B) defined by a pocket side abutment surface angle (μ); and
the pocket side abutment surface angle (μ) is in the range, 34°≤μ≤48°.

23. The insert holder (24), according to claim 20, wherein:
each non-lateral indexing gap (85) has an angular dimension about the pocket major axis (B) defined by a gap angle (6);
each of the plurality of right cylindrical pocket side abutment surfaces (88) has an angular dimension about the pocket major axis (B) defined by a pocket side abutment surface angle (μ); and
the gap angle (δ) is less than the pocket side abutment surface angle (μ).

24. The insert holder (24), according to claim 23, wherein the gap angle (δ) is less than half the pocket side abutment surface angle (p).

25. The insert holder (24), according to claim 20, wherein the axially extending internal cylindrical pocket lateral surface (80) is divided by exactly one non-lateral indexing gap (85) into exactly two right cylindrical pocket side abutment surfaces (88).

26. The insert holder (24), according to claim 20, wherein the pocket support surface (76) is planar and perpendicular to the pocket major axis (B).

27. The insert holder (24), according to claim 20, wherein the holder pocket (26) comprises a pocket threaded bore (78) recessed in and opening out to the pocket base surface (72) along a threaded bore axis (S).

28. The insert holder (24), according to claim 20, wherein: the pocket peripheral surface (74) further comprises one or two lateral indexing gaps (90), the one or two lateral indexing gaps (90) being formed at the intersection of the pocket lateral surface (80) with the holder main surface (66) and/or at the intersection of the pocket lateral surface (80) with the holder end surface (68).

29. The insert holder (24), according to claim 28, comprising exactly two lateral indexing gaps (90), one on either side of the at least one non-lateral indexing gap (85).

30. The insert holder (24), according to claim 20, wherein the at least one non-lateral indexing gap (85) extends the entire height of the pocket lateral surface (80).

31. An insert holder (24) comprising:
a holder main surface (66) that intersects a holder end surface (68), and
a holder pocket (26) recessed in the holder main surface (66) and opening out to the holder end surface (68) at a pocket opening (70), the holder pocket (26) having a pocket major axis (B) and comprising:
a pocket base surface (72), and a pocket peripheral surface (74) oriented substantially perpendicularly thereto and forming a partial boundary thereof, the pocket base surface (72) being unbounded by the pocket peripheral surface (74) at the pocket opening (70) and comprising a pocket support surface (76); wherein:
the pocket peripheral surface (74) comprises:
an axially extending internal cylindrical pocket lateral surface (80) divided into a plurality of angularly spaced apart concave cylindrical pocket side abutment surfaces (88) by at least one non-lateral indexing gap (85) recessed therein, each non-lateral indexing gap (85) located between a pair of adjacent concave cylindrical pocket side abutment surfaces (88); wherein:
each non-lateral indexing gap (85) has an angular dimension about the pocket major axis (B) defined by a gap angle (6); and
the gap angle (6) is in the range, 12°≤δ≤26°.

32. A cutting tool (20) comprising:
a cutting insert (22) in accordance with claim 1; and
an insert holder (24) in accordance with claim 20; wherein:
the cutting tool (20) is adjustable between a released and fastened position; and
in the fastened position of the cutting tool (20):
the cutting insert (22) is releasably retained in the holder pocket (26);
each of the plurality of cylindrical pocket side abutment surfaces (88) abuts a respective insert side abutment surface (64);
a pocket support surface (76) located on the pocket base surface (72) abuts an insert lower bearing surface (38) located on the insert lower surface (32); and each non-lateral indexing gap (85) is occupied by a respective indexing latch (54).

33. The cutting tool (20), according to claim 32 wherein:
in the fastened position of the cutting tool (20):
each non-lateral indexing gap (85) does not angularly or axially clamp the respective indexing latch (54).

34. The cutting tool (20), according to claim 32 wherein:
the cutting insert (22) comprises an insert through bore (52) extending between, and opening out to, the insert upper and lower end surfaces (30, 32) along the insert central axis (A);
the holder pocket (26) comprises a pocket threaded bore (78) recessed in, and opening out to the pocket base surface (72) along a threaded bore axis (A); and
in the fastened position of the cutting tool (20):
the cutting insert (22) is releasably retained to the insert holder (24) by a retaining screw (28) located in the insert through bore (52) and threadingly received in the pocket threaded bore (78).

35. The cutting tool (20), according to claim 34 wherein:
the cutting tool (20) is adjustable between a first fastened position and a second fastened position, via a first intermediate position and a second intermediate position; and
in the first intermediate position of the cutting tool (20):
the retaining screw (28) is located in the insert through bore (52) and partially threadingly received in the pocket threaded bore (78);
the cutting insert (22) is disposed away from the plurality of cylindrical pocket side abutment surfaces (88); and
each non-lateral indexing gap (85) is unoccupied by a respective indexing latch (54).

36. The cutting tool (20), according to claim 35, wherein:
the pocket peripheral surface (74) further comprises two lateral indexing gaps (90), one formed at the intersection of the pocket lateral surface (80) with the holder main surface (66) and the other formed at the intersection of the pocket lateral surface (80) with the holder end surface (68); and
in the first intermediate position of the cutting tool (20):
at least one of the two lateral indexing gaps (90) is unoccupied by a respective indexing latch (54).

37. The cutting tool (20), according to claim 35 wherein:
in the second intermediate position of the cutting tool (20):
the cutting insert (22) is rotated about the insert central axis (A) so that each non-lateral indexing gap (85) is angularly aligned with a respective insert side abutment surface (64) and each cylindrical pocket side abutment surface (88) is angularly aligned with a respective indexing latch (54).

38. The cutting tool (20), according to claim 32 wherein:
each of the plurality of indexing latches (54) have an angular dimension about the insert central axis (A) defined by a latch angle ($\alpha$);
each non-lateral indexing gap (85) has an angular dimension about the pocket major axis (B) defined by a gap angle ($\delta$); and
the gap angle ($\delta$) is greater than the latch angle ($\alpha$) by no more than 1°.

* * * * *